Aug. 8, 1933.  O. A. MILAM  1,921,238
MACHINE FOR HULLING NUTS AND THE LIKE
Filed Nov. 19, 1930  3 Sheets-Sheet 1
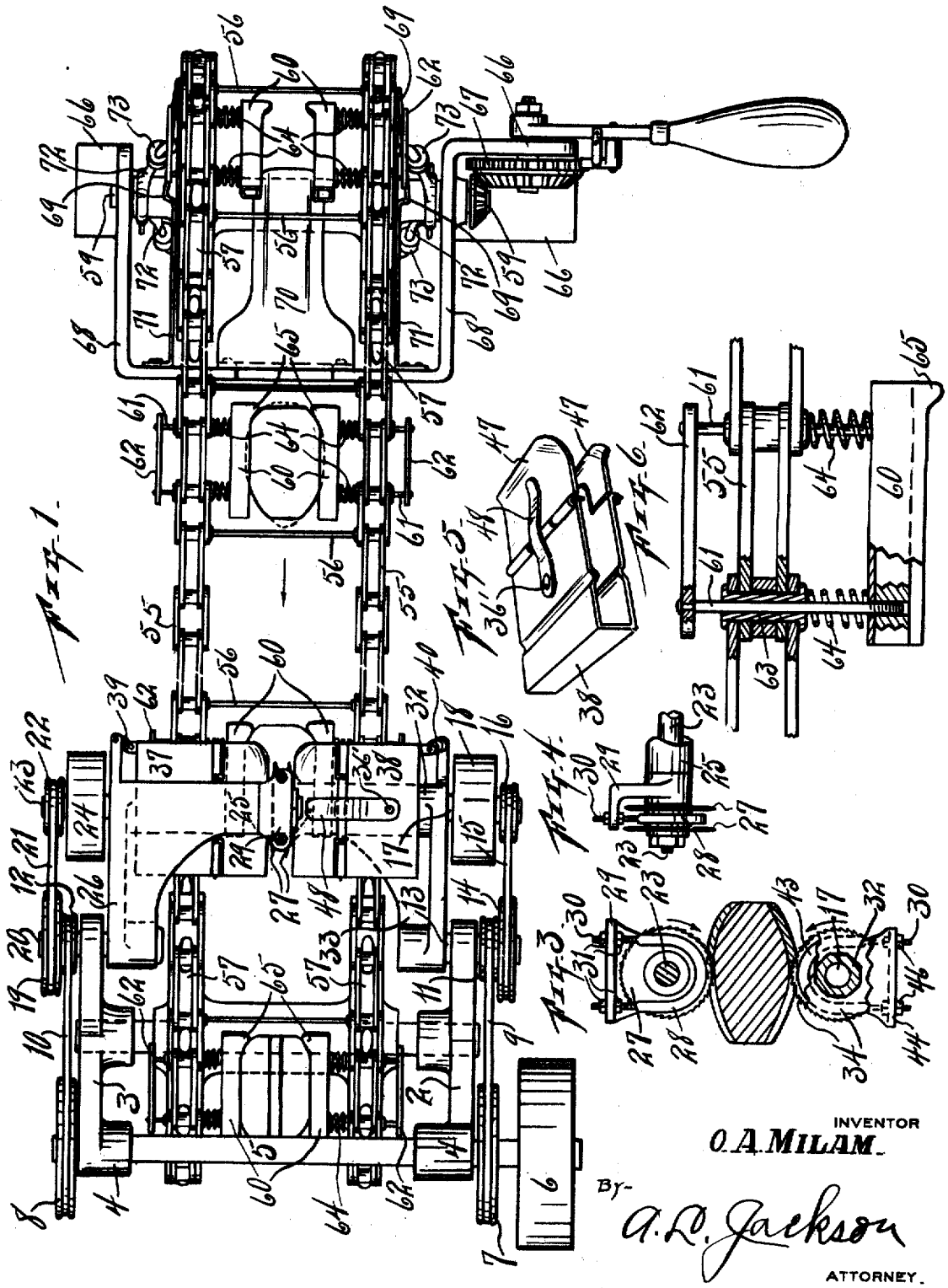
INVENTOR
O. A. MILAM
By A. L. Jackson
ATTORNEY

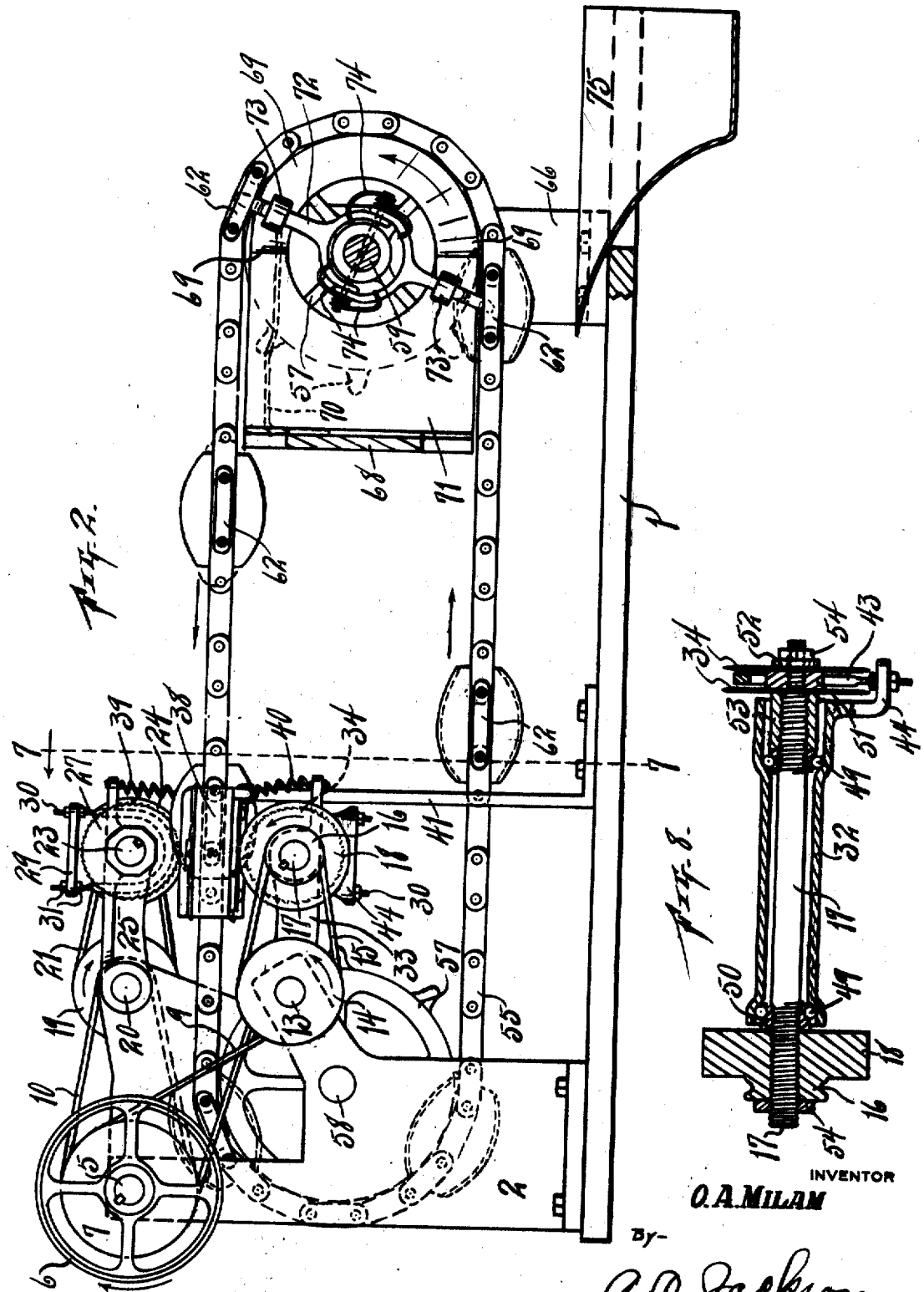

Aug. 8, 1933.  O. A. MILAM  1,921,238
MACHINE FOR HULLING NUTS AND THE LIKE
Filed Nov. 19, 1930  3 Sheets-Sheet 3
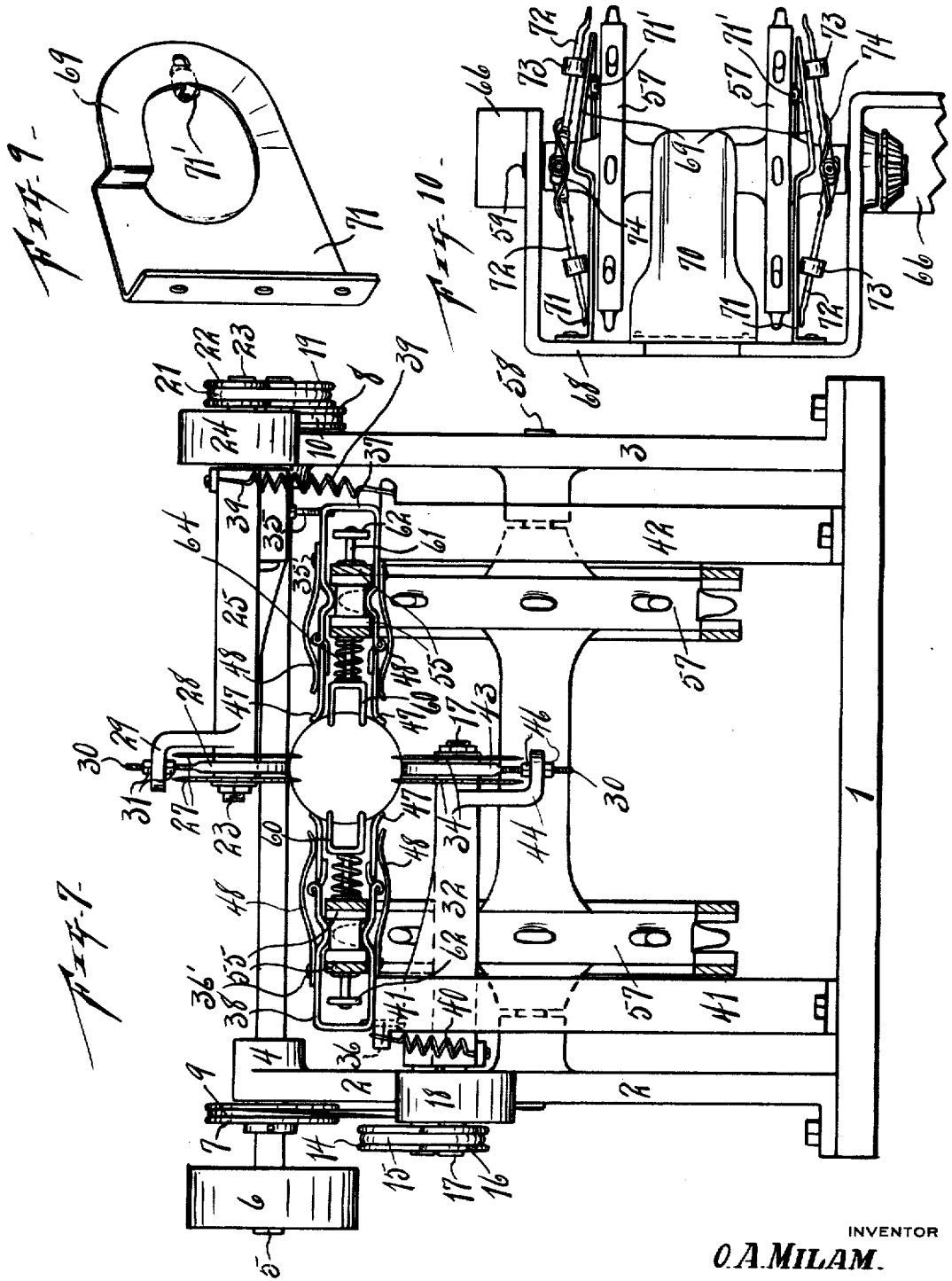
INVENTOR
O. A. MILAM.
BY
A. L. Jackson
ATTORNEY Patented Aug. 8, 1933

1,921,238

UNITED STATES PATENT OFFICE 1,921,238

MACHINE FOR HULLING NUTS AND THE LIKE

Oran Agustus Milam, Brownwood, Tex., assignor of one-third to Douglas Coakson and one-third to Robert E. Milam, Brownwood, Tex.

Application November 19, 1930
Serial No. 496,746

9 Claims. (Cl. 146—10)

This invention relates to new and useful improvements in machines for hulling nuts and the like.

One object of the invention is to provide an improved machine for sawing the hulls of nuts, both hard shells and semi-hard shells, substantially without injuring the kernels or meats.

Another object of the invention is to provide a machine of the character described which will be simple in construction and easily operated with accuracy, and which will act positively.

A further object of the invention is to provide a machine having improved means automatically adjustable to the nuts or other objects to be sawed.

Still another object of the invention is to provide a machine for sawing the shells of nuts or seeds which have therein longitudinal partitions, and particularly to saw such shells longitudinally of the nut.

A further object of the invention is to provide in conjunction with circular saws, stationary gauges for regulating the depth to which the saws cut.

A construction designed to carry out the invention will be hereinafter described together with other features of the invention.

The invention will be more readily understood from a reading of the following specification and by reference to the accompanying drawings in which an example of the invention is shown, and wherein:—

Fig. 1 is a plan view of the machine assembled.

Fig. 2 is a side elevation of the same, the ratchet driving mechanism being omitted.

Fig. 3 illustrates the application of the saws to a nut in the act of slitting the hull.

Fig. 4 is a detail view, showing the double saws and the guard between the saws for preventing the saws from cutting into the kernels or meats of the nuts or seeds.

Fig. 5 is a perspective view of the guide which centers the chain and the nuts in operative relation, centering the same relative to the saws.

Fig. 6 is a plan view, partly in section, of one side of the carrying chain, showing the manner of yieldingly mounting the nut holders.

Fig. 7 is a transverse section of the carrier chains carrying a nut and showing the yielding holders for the nut and showing the saws operating on a nut, also showing the guide shown in Fig. 5.

Fig. 8 is a detail view of the drive of one set of saws, showing the shaft housing in section.

Fig. 9 is a perspective view of one of the cams used in spreading the holders for discharging and receiving nuts.

Fig. 10 is a plan view of the driving sprocket wheels and the cams which effect a spreading of the nut holders.

Similar characters of reference are used to indicate the same parts throughout the several views.

The machine is provided with a frame having a base 1 and uprights 2 and 3 bolted thereto. The frame members 2 and 3 have bearings 4 for the shaft 5 which is the power shaft. Power is applied to the shaft 5 by means of a power pulley 6 which may be driven by any suitable power. Power is transmitted from the shaft 5 by means of pulleys 7 and 8 and belts 9 and 10. Belt 9 drives a pulley 11 which turns on a stub shaft 13 and this pulley is rigid or integral with a drive pulley 14 and pulley 14 drives belt 15 which drives pulley 16 which is rigid with and drives the lower saw shaft 17. A balance wheel 18 is rigid with shaft 17.

Belt 10 drives a pulley 12 which turns on a stub shaft 20 and this pulley is rigid or integral with drive pulley 19 and drives pulley 19. The stub shaft 20 is journaled in frame member 3. Pulley 19 drives a belt 21 and belt 21 drives pulley 22 which drives the saw shaft 23. A balance wheel 24 is rigid with shaft 23. The shaft 23 is journaled in a ball bearing housing 25 which is supported by an arm 26 which swings on stub shaft 20. The shaft 23 drives the upper saws 27. A saw guard 28 is mounted between the saws 27 and supported from an arm 29 which is formed on the housing 25. The guard 28 has threaded arms 30 which project through the support 29. The guard 28 is made adjustable vertically by nuts 31. The object of the guard 28 is to limit the depth of the saws 27 into the nut so that the meat will not be injured. Some nuts will have thicker hulls than others. For this reason the guard 28 will have to be adjustable towards and from the teeth of the saws. The support of the shaft 23 is similar to the support of shaft 17 shown in Fig. 8.

The shaft 17 is supported in a bearing housing 32 which is supported by an arm 33 which swings on stub shaft 13. The extent of the swinging of the arms 26 and 33 must be gaged so that the saws 27 and 34 will not come together when there is no nut between the saws. The downward movement of the upper arm 25 is limited by a stud bolt 35 which projects from the guide 37. The upward movement of the arm 33 is limited by a stud bolt 36 which projects from the guide 38. The upper saws 27 are held yieldingly against the nut by a spring 39. The lower saws 34 are held yieldingly against the nut by a spring 40 which is attached to the housing 32 and to the support 41. The spring 39 is attached to the housing 25 and to the support 42. The lower saws 34 have a guard 43 similar to guard 28 and which is supported by an arm 44 formed on the housing 32, and adjusted by nuts 46. The saws 27 and 34 are thus yieldingly held in contact with the nut and follow the contour of the nut from end to end. The springs 39 and 40 should be as nearly equal as possible as to strength, and should press equally on both sides of the nut.

The guides 37 and 38 are held in place by the supports 41 and 42 which are bolted onto the frame 1. The guides 37 and 38 have pivoted members 47 which are held against the nut by springs 48 which are attached to the guides 37 and 38 by the stud bolts 35' and 36'. The purpose of these guides with their pivoted members is to center the nut relative to the saws and to hold the nut with more or less firmness against the saws. These guides also center the carrier chains.

The saw assembly is shown in Fig. 8. The saw shaft 17 operates in the housing 32 and is provided with ball bearings 49 which are held in races formed by the housing 32 and by seats 50. The saws 34 are held against axial movement by flanges 51 and 52 and 53 which are rigid with and turn with the shaft 17 and the assembly is held intact by the nuts 54. The upper saw assembly is similar to the assembly shown in Fig. 8.

The carrier chain is made up of two members 55 which are spaced apart by bars 56 and driven by sprocket wheels 57 which are rigid with the shafts 58 and 59. The shaft 59 is the driven shaft and driven by a ratchet mechanism, shown in Fig. 1. The nuts are carried in holders which are attached to the sprocket chain or carrier chain 55. The nut holders 60 are mounted on the carrier 55 by means of plungers 61 which are rigid with bars 62 and operate through sleeves 63 which serve as pivot bolts for the chain members of the carrier 55. The holders 60 are held against the nuts by spring 64 which are mounted on the plungers 61 between the chain members 55 and the holders 60. The springs 64 should be as nearly as possible equal in strength and these springs constantly press the holders on the nuts. The holders have integral lugs 65 which prevent the nuts from moving backwardly through the holders when the nut is applied to the saws. The holders 60 are thus yieldingly mounted on the plungers 61 so that the holders can be pressed far enough apart to receive the nuts. The holders 60 are pressed apart mechanically. The holders 60 are spread to receive and discharge nuts. A bearing frame 66 is provided for the shaft 59 which is the driving shaft. The shaft 59 is driven by a ratchet mechanism 67 or any other suitable means. Arms 68 are attached rigidily to the bearing frame 66 or made integral therewith. Cams 69 and a nut support 70 are attached rigidly to the forward ends of the arms 68. The points of attachment of the cams 69 and the arms 68 are positioned between the upper and lower parts of the chain carrier. The rear part of the nut support 70 is just below the path of the holders 60. The cams 69 follow substantially the curvatures of the sprocket wheels 57 and friction against the sprocket wheels 57 is prevented by rollers 71. The cams are rigidly mounted by reason of the attachment to the forward parts of the arms 68. The cams 69 have forwardly projecting arms 71 for attachment to the arms 68. The nut holders 60 are spread by arms 72 which are pivotally mounted on shaft 59 and are provided with rollers 73. Springs 74 urge the rollers 73 and arms 72 yieldingly towards the cams 69. The rollers 73 are forced outwardly by the cams 69 and the arms 72 project between the bars 62 and the carrier chain 55 and thus force the holders 60 apart for discharging the nuts below the sprocket wheel into the chute 75. The holders 60 are held spread as they pass around the sprocket to a point over the nut support 70. The nut is placed between the holders at this point and the rollers pass off of the cams 69 simultaneously so that the holders will grasp the nut. In case the nut has a longitudinal partition, it is placed manually with the partition set vertically so that the saws will cut the shell on each side of the partition. The carrier moves the nuts forward to the saws and the saws are revolving towards the nuts for cutting the shells. The nuts are carried by the carrier and discharged when the holders are spread by the arms 72. The carrier is timed by the ratchet mechanism so that each downward stroke of the ratchet handle places a pair of holders in position to receive a nut.

In operating the machine, the nuts are placed one at a time on the nut support 70, and the ratchet mechanism 67 is operated to drive the chain carrier 55 as hereinbefore explained. As the holders 60 approach the sprocket wheels 57, the arms 72 will engage between the chains and the bars 62 as will be evident from Figure 2. When the rollers 73 engage the cams 69, the holders will be spread so that in passing over the support 70 the nut will be received between said holders, and as the rollers 73 ride off the tops of said cams, the nuts will be grasped in said holders because of the spring 64.

The loaded holders 60 will carry the nuts between the saws 27 and 34, and these saws being yieldably mounted will follow the contour of each nut and saw slits therein. The guards 28 and 43 will limit the depth of the saw cuts by riding on the shell of each nut and thus saving the meats from injury. After passing between the saws, the nuts will be carried by the chains until the arms 72 engage behind the bars 62 to spread the holders 60. When this occurs the nuts will be released and fall into a receptacle 75.

What I claim, is,—

1. In a nut sawing machine, a frame, a pair of chain conveyors mounted upon said frame, yieldable nut holders mounted on said chains in opposed relation, an upper saw yieldably mounted on the frame and a lower saw yieldably mounted on the frame, the holders carrying the nuts between the saws, and means between the saws for supporting the holders and centering the nuts with relation to the saws.

2. A nut sawing machine as set forth in claim 1 and adjustable guards mounted in stationary relation to each saw for regulating the depth to which the saws cut.

3. In a nut sawing machine, the combination of a frame, two pairs of double circular saws swingingly mounted in said frame, each pair of saws having a balance wheel connected therewith, means for yieldably supporting the saws, means for constantly driving the saws, and adjustable guards for regulating the depth to which the saws cut.

4. In a nut sawing machine, the combination of a frame, an upper swinging support mounted on the frame, circular saws carried by said support, a lower swinging support mounted on the frame, circular saws carried by the lower support, guides rigidly mounted on the frame and having yieldable lips, said guides being located relatively between the saws, a pair of carrier chains connected to travel in unison, and spring pressed nut holders mounted between said chains and adapted to pass through said guides so as to bring each nut into contact with the yieldable lips.

5. A nut sawing machine as set forth in claim 4 with means for revolving the saws and separate means for actuating the chains.

6. A nut sawing machine as set forth in claim 4 and means at one end of the chain for actuating the holders to open the same both for receiving nuts as well as for discharging nuts.

7. In a nut sawing machine, the combination with saws for sawing the nuts, of a pair of carrier chains, sprocket wheels for supporting said chains, spring pressed nut holders carried by said chains and directed toward each other, arms mounted to revolve with the sprockets at one end of the carrier for engagement with the nut holders to retract the same, rollers mounted on said arms, and cams in the path of said rollers.

8. In a nut sawing machine, a swinging support, a shaft journaled in said support, a pair of spaced circular saws fastened on said shaft, a guard mounted between said saws, an arm carried by the support, and an adjustable connection between the guard and the arm for adjusting said guard to regulate the depth of the cut of said saws.

9. In a nut sawing machine, the combination of a frame, a pair of carrier chains mounted on said frame, yieldable nut holders mounted on said chains, means for retracting said nut holders to receive nuts and also to discharge nuts, a pair of rapidly revolving circular saws between which the nuts are carried by the nut holders, and a pair of guides adjacent the saws for supporting the chains and centering the nuts with relation to said saws.

ORAN AGUSTUS MILAM.

CERTIFICATE OF CORRECTION.

Patent No. 1,921,238.  August 8, 1933.

ORAN AGUSTUS MILAM.

It is hereby certified that the name of the first mentioned assignee, was erroneously written and printed as "Douglas Coakson" whereas said name should have been written and printed as "Douglas Coalson" as shown by the records of assignments in this office; and that the said Letters Patent should be read with this correction therein that the same may conform to the record of the case in the Patent Office.

Signed and sealed this 19th day of September, A. D. 1933.

M. J. Moore.

(Seal)  Acting Commissioner of Patents.

port, a lower swinging support mounted on the frame, circular saws carried by the lower support, guides rigidly mounted on the frame and having yieldable lips, said guides being located relatively between the saws, a pair of carrier chains connected to travel in unison, and spring pressed nut holders mounted between said chains and adapted to pass through said guides so as to bring each nut into contact with the yieldable lips.

5. A nut sawing machine as set forth in claim 4 with means for revolving the saws and separate means for actuating the chains.

6. A nut sawing machine as set forth in claim 4 and means at one end of the chain for actuating the holders to open the same both for receiving nuts as well as for discharging nuts.

7. In a nut sawing machine, the combination with saws for sawing the nuts, of a pair of carrier chains, sprocket wheels for supporting said chains, spring pressed nut holders carried by said chains and directed toward each other, arms mounted to revolve with the sprockets at one end of the carrier for engagement with the nut holders to retract the same, rollers mounted on said arms, and cams in the path of said rollers.

8. In a nut sawing machine, a swinging support, a shaft journaled in said support, a pair of spaced circular saws fastened on said shaft, a guard mounted between said saws, an arm carried by the support, and an adjustable connection between the guard and the arm for adjusting said guard to regulate the depth of the cut of said saws.

9. In a nut sawing machine, the combination of a frame, a pair of carrier chains mounted on said frame, yieldable nut holders mounted on said chains, means for retracting said nut holders to receive nuts and also to discharge nuts, a pair of rapidly revolving circular saws between which the nuts are carried by the nut holders, and a pair of guides adjacent the saws for supporting the chains and centering the nuts with relation to said saws.

ORAN AGUSTUS MILAM.

CERTIFICATE OF CORRECTION.

Patent No. 1,921,238.                      August 8, 1933.

ORAN AGUSTUS MILAM.

It is hereby certified that the name of the first mentioned assignee, was erroneously written and printed as "Douglas Coakson" whereas said name should have been written and printed as "Douglas Coalson" as shown by the records of assignments in this office; and that the said Letters Patent should be read with this correction therein that the same may conform to the record of the case in the Patent Office.

Signed and sealed this 19th day of September, A. D. 1933.

M. J. Moore.

(Seal)                            Acting Commissioner of Patents.

CERTIFICATE OF CORRECTION.

Patent No. 1,921,238.     August 8, 1933.

ORAN AGUSTUS MILAM.

It is hereby certified that the name of the first mentioned assignee, was erroneously written and printed as "Douglas Coakson" whereas said name should have been written and printed as "Douglas Coalson" as shown by the records of assignments in this office; and that the said Letters Patent should be read with this correction therein that the same may conform to the record of the case in the Patent Office.

Signed and sealed this 19th day of September, A. D. 1933.

M. J. Moore.

(Seal)     Acting Commissioner of Patents.